United States Patent Office 3,130,924
Patented Apr. 28, 1964

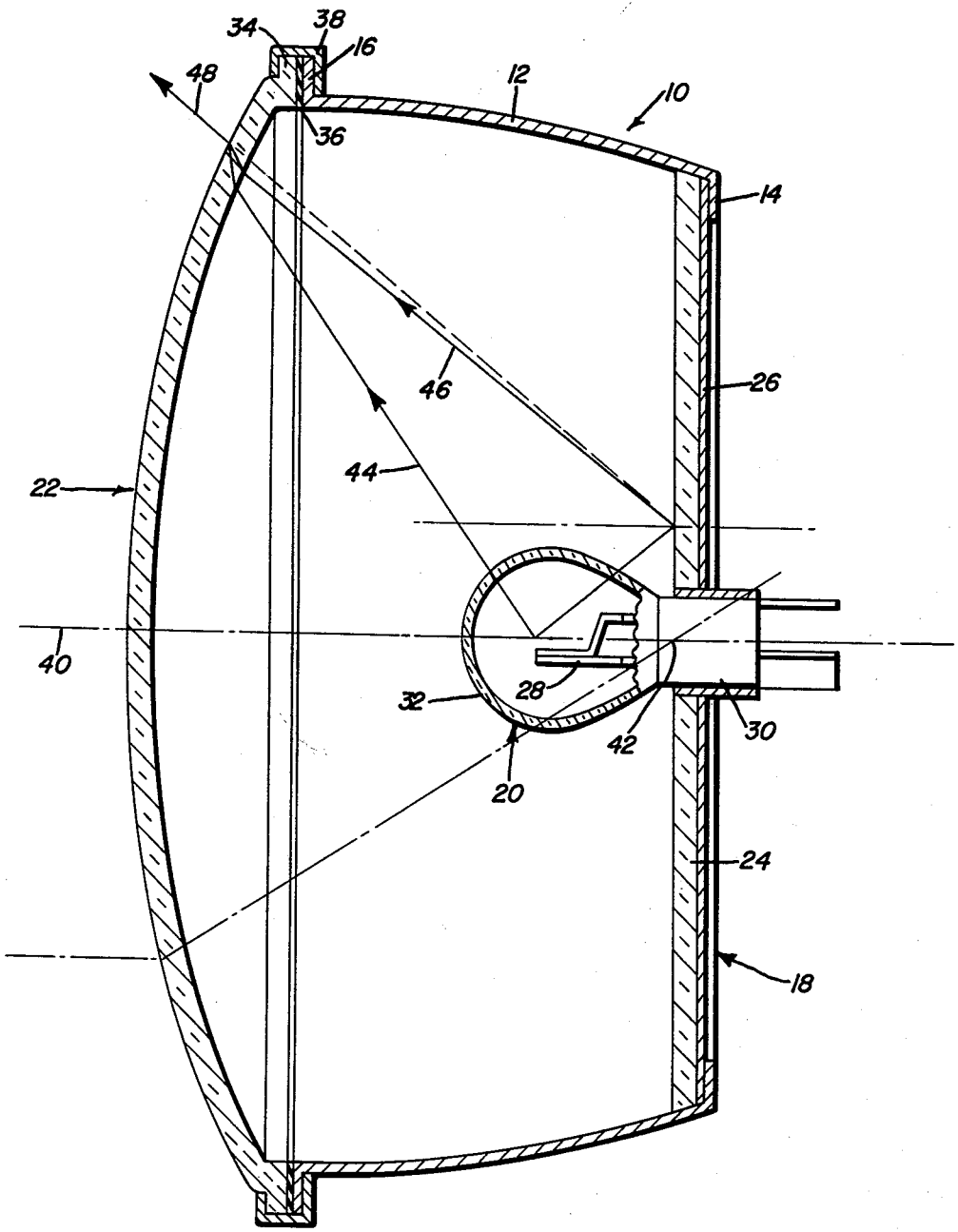

3,130,924
NON-GLARE LAMP
John W. Gish, 1917 Hickman St., Ashland, Ky.
Filed Sept. 27, 1961, Ser. No. 141,184
2 Claims. (Cl. 240—41.3)

This invention relates to lamps of the sealed beam type particularly adapted for providing illumination from an automotive vehicle although not necessarily restricted thereto.

The present invention is concerned with the provision of illumination of increased intensity but without the glare producing effects of lamps heretofore utilized for providing comparable amounts of illumination. It is therefore a primary object of this invention to provide a non-glare lamp which is of relatively simple and economical design and yet capable of providing an increased amount of illumination with a minimum amount of glare.

Another object of this invention is to provide a non-glare lamp which utilizes a source of light enveloped by a light absorbing envelope for eliminating those portions of the light spectrum to which the human eye is most sensitive and mounting said light source between a reflector and a high powered image enlarging lens so as to transmit light rays from the light source in an indirect fashion to prevent glare and also with increased intensity.

These together with other objects and advantages which will become subsequently apparent reside in the details of construction and operation as more fully hereinafter described and claimed, reference being had to the accompanying drawing forming a part hereof, wherein like numerals refer to like parts throughout.

The novel lamp of the present invention is generally referred to in the drawing by reference numeral 10. The lamp 10 includes therefore an imperforate opaque casing 12 of annular form as shown in the drawings which is of a generally diverging shape between a rear annular flange portion 14 projecting radially inward, and a forward annular flange portion 16 being directed radially outwardly. Mounted forwardly of the flange portion 14 is a reflector generally referred to by reference numeral 18. The reflector 18 is of the non-distorting image type forming a plane reflective surface disposed rearwardly of the source of light which is generally referred to by reference numeral 20. Connected to the casing 12 and disposed forwardly of the source of light 20 is an image enlarging lens generally referred to by reference numeral 22.

The reflector 18 is preferably made of heavy clear plate glass 24 the rear surface of which is silvered by the layer 26 for reflection purposes. The light source 20 may be in the form of a tungsten filament type of incandescent lamp 28 mounted by means of a lamp fitting 30 received within a central aperture in the reflector 18. The lamp filament as is conventional, is enveloped by an envelope 32 which is made of china or white milk glass so that those portions of the light spectrum most sensitive to the human eye may be absorbed. The lens 22 is a high powered magnifying lens having a convexo-convex curvature with an annular connecting mounting rim 34 disposed in confronting relation to the annular flange 16 of the casing 12 and separated therefrom by a sealing strip 36. Any suitable annular sealing member 38 may be provided for holding the lens 22 in mounted relation on the casing 12.

It will be observed from the drawing, that the lens 22 is optically alined with the source of light 20 and the reflector 18 with respect to the optical axis 40. Also, one of the focal points 42 of the lens 22 is spaced rearwardly of the lens 22 a distance equal to the optical spacing between the reflector 18 and the lens 22. This arrangement is most preferable for efficient transmission of light for increased illumination. It will also be observed, that the curvature of the lens 22 is so designed with respect to the spacing of the light source 20 from the focal point 42, and from the lens itself that direct light rays 44 from the light source will converge with reflected light rays 46 when passing through the lens 22 into illuminating output light rays 48 of increased intensity. It will be therefore apparent that the reflection point on the reflector 18 will be the apparent source of light to a viewer so as to prevent glare otherwise resulting from direct viewing of the light source.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A lamp device for providing directed illumination in a glare-free manner comprises, casing means having a front end through which all illumination is emitted, a transparent lens having image enlarging means thereon closing the front end of the casing means, said lens having a smooth, convexo-convex surface curvature with an outer convex and inner concave surface, a plane surface reflector mounted by said casing means having flat inner and outer surfaces in spaced relation from said front end facing the concave surface of said lens for reflecting light emitted internally of the casing means, the focal point of said lens coinciding with the inner surface of the reflector, a source of internally emitted light mounted in the casing means optically aligned between the reflector and said lens, and radiation absorbing means completely enclosing said source of light for absorbing selected wave lengths of light emitted from the source of light and reflected from the reflector, said lens curvature being such that rays of light emitted directly from said source through said lens are reinforced by rays of light reflected from the reflector.

2. The device set forth in claim 1 wherein the rediation absorbing means comprises, an envelope of white milk glass.

References Cited in the file of this patent

UNITED STATES PATENTS

| | | |
|---|---|---|
| 141,183 | Stout | July 22, 1873 |
| 1,081,211 | Churchill | Dec. 9, 1913 |
| 1,285,901 | Bausch et al. | Nov. 26, 1918 |
| 1,765,242 | Reiter | June 17, 1930 |
| 1,954,010 | Koubek | Apr. 10, 1934 |
| 2,001,472 | Sauer | May 14, 1935 |
| 2,102,975 | Rolph | Dec. 21, 1937 |
| 3,009,054 | Thomas | Nov. 14, 1961 |